THE SO₂ OXYDEHYDROGENATION OF ETHYLBENZENE TO STYRENE IN THE PRESENCE OF STEAM

THE EFFECT OF $H_2$ ON THE $SO_2$ OXYDEHYDROGENATION OF ETHYLBENZENE TO STYRENE IN THE PRESENCE OF STEAM

United States Patent Office 3,763,258
Patented Oct. 2, 1973

3,763,258
TWO-STEP DEHYDROGENATION PROCESS
Abraham D. Cohen, Sarnia, Ontario, Canada, assignor to Esso Research and Engineering Company
Filed June 2, 1971, Ser. No. 149,257
Int. Cl. C07c 5/18
U.S. Cl. 260—669 R
25 Claims

ABSTRACT OF THE DISCLOSURE

Organic compounds having a dehydrogenatable carbon to carbon bond are dehydrogenated in a vapor phase reaction by passing said compounds with steam into a first reaction zone and reacting said mixture over an autoregenerative dehydrogenation catalyst and thereafter contacting the products formed in the first reaction zone in a second reaction zone with a sulfur oxide over a critically defined low surface area catalyst.

FIELD OF THE INVENTION

This invention relates to a two-step process for the vapor phase dehydrogenation of organic compounds. More particularly, this invention relates to a process for dehydrogenating a compound having at least one

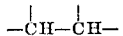

grouping, wherein adjacent carbon atoms are bonded to each other and have at least one hydrogen atom attached to each carbon atom, by passing said compounds with steam into a first reaction zone and reacting said dehydrogenatable compound-steam mixture over an autoregenerative dehydrogenation catalyst. The reaction products formed in the first reaction zone are reacted in a second reaction zone with a sulfur oxide, i.e., $SO_2$ or $SO_3$ or water solutions thereof, over a critically defined low surface area catalyst.

In a typical embodiment, ethylbenzene is dehydrogenated in high yields to styrene by initially reacting ethylbenzene with steam at elevated pressures over an autoregenerative iron oxide catalyst at a temperature in the range of from about 1025° to 1250° F. to convert about 40 mole percent ethylbenzene to styrene at a selectivity of about 90 mole percent, i.e., overall styrene yield of about 40 mol percent. Thereafter, said reaction product, i.e., styrene, ethylbenzene, steam and hydrogen, is contacted with from about 0.15 to about 0.7 mole of sulfur dioxide per mole of ethylbenzene over a magnesium oxide catalyst having a surface area in the range of from about 4 to about 80 square meters per gram.

PRIOR ART

The catalytic, vapor phase dehydrogenation of organic compounds to produce unsaturated or more highly unsaturated products is an old and well-known process. The dehydrogenation reaction most usually employed is to pass the dehydrogenatable organic compound with from about 2 to about 30 moles of steam per mole of compound over a dehydrogenation catalyst at a temperature in the range of from about 1050° to about 1300° F. at a pressure ranging from subatmospheric to about 30 p.s.i.g. The prior art processes for dehydrogenation are replete with suggestions of numerous catalysts which can be used in dehydrogenating said organic compounds. Such catalysts generally consist of one or more metallic components from the metals of Groups VI and VIII of the Periodic Table, and compounds thereof, and are employed either run supported or supported on a refractory inorganic oxide material. Notwithstanding the wide variety of dehydrogenation catalysts, it becomes evident from a perusal of the prior art that any of the proposed catalysts appears to have inherently one or more drawbacks which detracts from the suitability and acceptability thereof. One class of catalysts found to be most effective for this process is an iron oxide type catalyst. One of the major advantages of these catalysts is that they are autoregenerative under reaction conditions in the presence of steam. This obviates the necessity of interrupting the process in regenerating the catalyst, such regeneration including the burning of carbon deposits off the surface of the catalyst particles, which is necessary with other dehydrogenation catalysts. One of the disadvantages of these catalysts is that the selectivity (moles of desired dehydrogenaed product produced per mole of dehydrogenatable organic compound reacted) of the reaction drops markedly under reaction conditions conducive to high conversion (moles of dehydrogenatable compound reacted). Thus, any improvement which results in increasing either the selectivity or the conversion without lowering the other is economically very attractive since this means that the yield (moles of desired dehydrogenatable product produced per mole of dehydrogenatable compound) of the product per pass has been increased, ameliorating both product separation and feed recycle. By the process of this invention, this major disadvantage of the prior art processes is greatly alleviated, thereby resulting in high yields of dehydrogenated product over long reaction periods.

SUMMARY OF THE INVENTION

In accordance with this invention, the dehydrogenatable organic compound is passed with from about 1 to about 20 moles of steam per mole of dehydrogenatable compound at a temperature in the range of from about 1025° to about 1500° F. into a first reaction zone and reacted with an autoregenerative dehydrogenation catalyst at a temperature in the range of from about 1025° to about 1250° F. in order to convert about 5 to about 60 mole percent of the dehydrogenatable organic compound at a selectivity of about 86 to about 98 mole percent to the desired dehydrogenated product. Thereafter, the reaction products from the first reaction zone, i.e., the dehydrogenated organic compound, along with the dehydrogenatable organic compound, steam and hydrogen formed in said first reaction zone, are passed into a second reaction zone and reacted with a sulfur oxide at a temperature in the range of from about 800° to about 1250° F. over a critically defined low surface area catalyst, as will be hereinafter discussed.

While not wishing to be bound to any particular theory, it is believed that the success of the process described herein is due in large part to the discovery that the hydrogen formed in the first reaction zone does not react with the sulfur oxide in the second reaction zone permitting a marked reduction in the level of sulfur dioxide heretofore necessary to effect high conversion of the dehydrogenatable organic compound, thus allowing a high conversion of the dehydrogenatable organic compound without undue loss of selectivity due to the desired dehydrogenated product to tars and sulfur containing heavy products.

As has been discussed in copending application U.S. Ser. No. 886,582, filed on Dec. 19, 1969, now U.S. Pat. 3,636,183, and in U.S. Ser. No. 780,528, filed on Dec. 2, 1968, now U.S. Pat. 3,585,248 the disclosures of which are herein incorporated by reference; the overall endothermic reaction for the sulfur dioxide dehydrogenation of a dehydrogenatable organic hydrocarbon feedstock is in accordance with the following generalized formula:

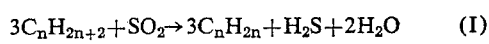

which shows that ⅓ mole of sulfur dioxide is theoretically required to dehydrogenate one mole of feedstock. While many processes have been reported, the commercial development of a sulfur dioxide process has been rather permanently delayed due to a serious problem involving catalyst life. Thus, it is believed that, while dehydrogenation is a principal reaction occurring, a portion of the feedstock and product formed in the second reaction zone of the instant process is being simultaneously degraded to form coke. This coke is formed at the surface of the catalyst, thereby shielding the catalyst from the reactants and causing rapid catalyst deactivation. The coke reaction is further promoted by the presence of sulfur-containing compounds which are known to promote coking at reaction temperatures and are generally present due to side reactions between the hydrocarbon and $SO_2$. See, for example, U.S. Pat. No. 3,299,155, and Japanese Pat. No. 23,165/65, wherein the mole ratio of sulfur dioxide to hydrocarbon charge is maintained at from about 1:1 to about 2:1 and at about 1.3:1, respectively. Furthermore, when sulfur levels below those claimed are employed, such as to approach the stoichiometric equivalent, there is a significant loss in yield of the desired dehydrogenated compound (see Japanese Pat. No. 23,165/65—Table I). Consequently, the use of such high sulfur levels, in addition to drastically reducing catalyst life by promoting coke formation, significantly reduces the conversion and selectivity, and thus the yield to the desired dehydrogenated compounds. Furthermore, it is highly desirable in commercial applications to employ an inert diluent to reduce hydrocarbon losses to burning, coke and heavy products. Preferably, this inert diluent is steam in order to facilitate a relatively easy product recovery system. Unfortunately, the catalyst reported in the prior art is severely deactivated in the presence of steam.

Thus, in addition to the discovery that hydrogen does not react with a sulfur oxide, i.e., $SO_2$, under the reaction conditions existing in the second zone of the instant process, the success of this process is also due to the discovery that low surface area catalysts are selective in promoting the desired reaction and tend to minimize the hydrocarbon burning and coke formation mentioned above. As has been described in copending applications U.S. Ser. No. 886,582 and U.S. Ser. No. 780,528, the use of such catalyst is then a reversal from the general trend in catalysis. Since high surface area catalysts have been used successfully in endothermic reactions, it would appear reasonable to believe that they could be effectively used in the endothermic sulfur dioxide dehydrogenation of hydrocarbon feedstocks. Nevertheless, it has been found that high surface area catalysts are ineffective and that low surface area catalysts are effective to practice the process of the instant invention. Thus, high surface area catalysts tend to increase (catalyze) the rate of burning reactions, e.g.,

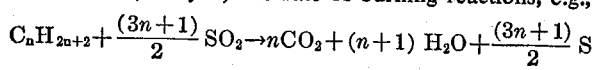

thereby giving rise to two major disadvantages. First, since the burning reaction will require far more $SO_2$ per mole of dehydrogenatable organic compound than the desired dehydrogenation reaction, burning of only a small amount of hydrocarbon removes a large amount of $SO_2$ from the system and makes it unavailable for dehydrogenation. Secondly, since burning is an exothermic reaction, where dehydrogenation with a sulfur oxide, i.e., $SO_2$, is endothermic, any amount of burning will tend to heat the catalyst bed, resulting in either localized or generalized hot spot formation. The hot spots then will tend to increase the rate of burning and cracking reaction as well as increasing catalyst fouling due to coke formation. Thus, hot spots give rise to both a lower yield of the desired products and rapid catalyst deactivation.

Accordingly, it is essential to employ a low surface area catalyst in the second reaction zone of the instant process. This requirement is necessitated by the fact that the catalyst must be selective to the desired reaction while inhibiting undesired side reactions such as cracking and/ or burning. In addition, as mentioned above, it is essential in commercial applications to employ a condensable diluent, namely steam, in order to reduce the partial pressure of the reactants in the reaction zone in order to prevent undue loss of hydrocarbons to burning, coke and heavy products. It has now been discovered that when steam is employed as the inert diluent, the hydrogen formed in the first reaction zone and thus passed as a reaction product into the second reaction zone does not react with the $SO_2$ present in said zone, i.e., no appreciable $SO_2$ oxidation of the hydrogen present to water and hydrogen sulfide under the conditions employed in said second reaction zone.

Figure 1:
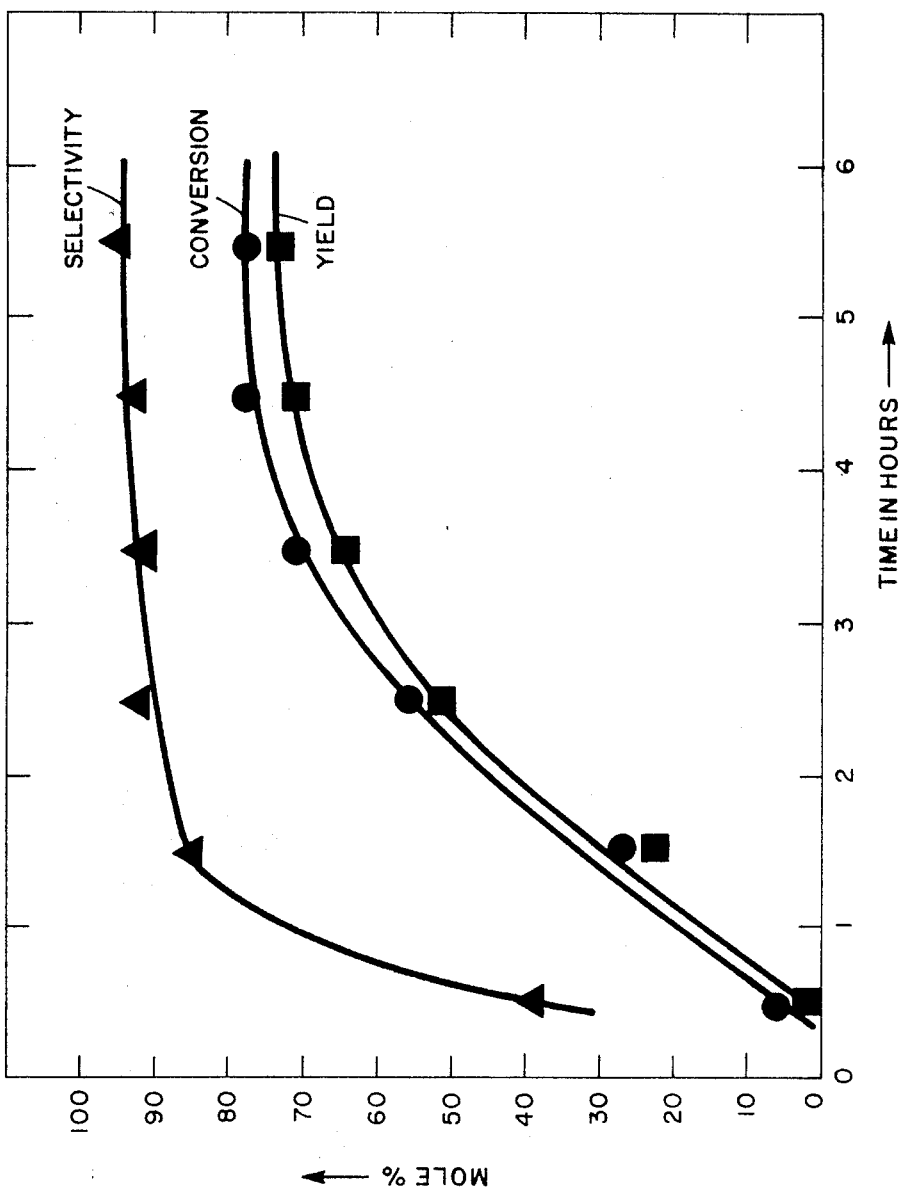
FIG. 1 shows a plot of the time against the mole percent yield of styrene from ethylbenzene dehydrogenation when an inert diluent, i.e., helium, is employed in addition to steam. The data for these curves were obtained in an ethylbenzene dehydrogenation, the ethylbenzene/sulfur oxide, i.e., $SO_2$/water/helium, mole ratio being 1/0.37/4/1 at a temperature of 1050° F. at atmospheric pressure over a magnesium oxide catalyst having a surface area of about 50 square meters per gram using an ethylbenzene space velocity of 0.6 w./w./hr.
Figure 2:
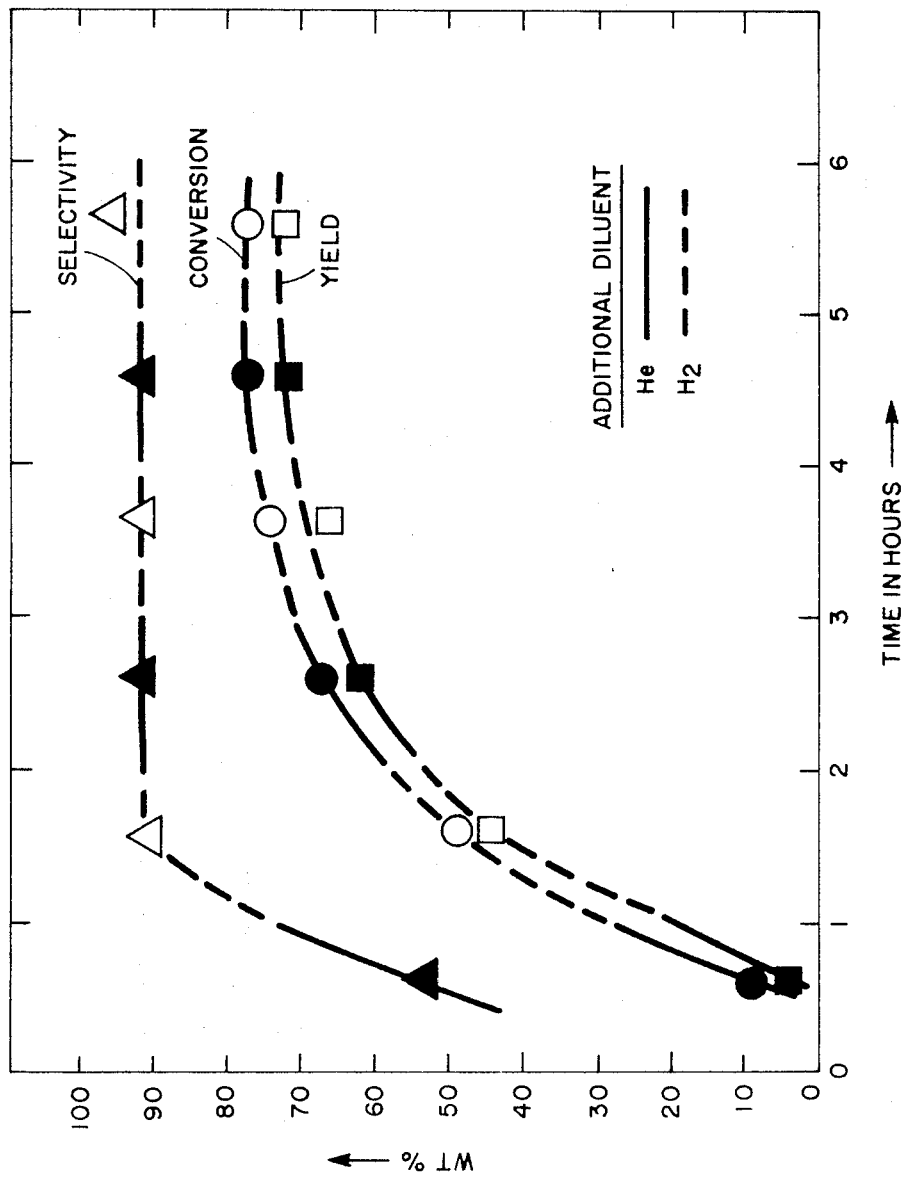
FIG. 2 illustrates the effect on the yield, i.e., conversion and selectivity, to the desired dehydrogenated product, i.e., styrene, when the inert diluent, i.e., helium, was replaced by an equimolar amount of hydrogen under the identical reaction conditions as those enumerated for FIG. 1. The dotted portion of the curves in FIG. 2 indicates the presence of one mole of hydrogen per mole of ethylbenzene in the reaction mixture. It will be noticed that for a given variable the curves shown in FIG. 1, within expected experimental deviation, are identical, particularly after 4½ hours when the catalyst is approaching optimum activity. Accordingly, it can be seen that the presence of large amounts of hydrogen does not reduce either the styrene yield or selectivity when the ethylbenzene is dehydrogenated with a sulfur oxide in the presence of steam diluent. Accordingly, hydrogen behaves as an inert diluent under the processing conditions employed in the second reaction zone of the instant process and accordingly allows a high conversion of ethylbenzene in the presence of hydrogen without an undue loss of selectivity to styrene.

The process of this invention can be applied to a great variety of dehydrogenatable organic compounds to obtain the unsaturated derivatives thereof. A suitable dehydrogenatable compound can be any organic compound that contains at least one

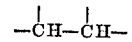

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogen, nitrogen and sulfur. Among the classes of organic compounds which can be dehydrogenated by this product are alkanes, alkenes, alkylhalides, ethers, esters, aldehydes, ketones, organic acids, alkyl aromatic compounds, alkyl heterocyclics, cyanoalkanes, cyanoalkenes, and the like. Illustrative, nonlimiting examples include: ethylbenzene to styrene, isopropyl benzene to alpha-methylstyrene, cyclohexane to benzene, vinyl cyclohexane or vinyl cyclohexene to styrene, chloroethylbenzene to chlorostyrene, ethane to ethylene, n-butane to butenes and butadienes, butene to butadiene, isobutane to isobutylene, methylbutene to isoprene, propionaldehyde to acrolein, ethylchloride to vinylchloride, propionitrile to acrylonitrile, methyl isobutyrate to methyl methacrylate, propionic acid to acrylic acid, ethyl pyridine to vinyl pyridine, ethylphenol to vinylphenol, and the like. Preferred dehydrogenatable feedstocks are the $C_2$–$C_{20}$ hydrocarbons, i.e., paraffins, alkylbenzenes, alkyl and alkenyl-substituted cycloaliphatic compounds, and monoolefins. Particularly preferred, however, are $C_2$–$C_9$ paraffins, $C_3$–$C_9$ monoolefins, $C_8$–$C_{16}$ alkylbenzenes, and $C_8$–$C_{16}$ alkyl and alkenyl-substituted cycloaliphatic compounds; still more particularly $C_4$–$C_8$ monoolefins and paraffins, $C_8$–$C_{10}$ alkylbenzenes, and $C_8$–$C_{10}$ alkyl and alkenyl-substituted cycloaliphatic compounds. Particularly effective as feedstocks are the olefinic hydrocarbons or alkylbenzenes or vinyl-substituted cycloaliphatics which may be dehydrogenated to provide a product wherein the major unsaturated product has the same number of carbon atoms as the feed hydrocarbon.

In accordance with the process of the instant invention, the above-identified dehydrogenatable organic compounds are contacted with steam and passed into the first reaction zone. The amount of steam which is employed, i.e., mole ratio of $H_2O$ to dehydrogenatable organic compounds is in the range of about 20 to about 1, preferably from about 17 to about 1, and more preferably from about 15 to about 1. The dehydrogenatable organic compound/$H_2O$ mixture is contacted in the first reaction zone with an autoregenerative dehydrogenation catalyst at a temperature in the range of about 1025° to about 1250° F., and more preferably from about 1100° to about 1160° F., at a pressure ranging from subatmospheric to about 30 p.s.i.g. and more preferably at a pressure in the range of from about 10 to about 25 p.s.i.g.

The specific type of autoregenerative dehydrogenation catalyst may be broadly described as one or more metallic components from the metals of Groups VI and VIII of the Periodic Table, and compounds thereof, which may be employed in either supported or unsupported form. Accordingly, suitable autoregenerative dehydrogenation catalytic composites include, but are not limited to, chromium, tungsten, molybdenum, iron, cobalt, nickel, platinum, palladium, iridium, ruthenium, rhodium, osmium, and mixtures thereof. Preferably, these are generally composited with carrier material comprising one or more inorganic oxides from the group of alumina, silica, zirconia, magnesia, thoria, hafnia, titania, boria and the like. Preferably, the autoregenerative dehydrogenation catalyst is an iron oxide compound including, but not limited to, by way of example, iron oxide promoted with potassium carbonate, modifications thereof, supported or unsupported, and including dehydrogenation catalysts as described in U.S. Pat. No. 2,414,585.

The initial dehydrogenation reaction in the first reaction zone is carried out for a period of time sufficient to form at least a 5 mole percent yield of the desired dehydrogenated product, i.e., to convert about 5 to 60 mole percent of the hydrocarbon feedstock, of which about 86 to about 98 mole percent consists of the desired dehydrogenated product, i.e., selectivity. More preferably, the dehydrogenation reaction occurring in the first reaction zone is carried out for a time sufficient to form from about 20 to about 40 mole percent of the desired dehydrogenated product at about 90 to about 98 mole percent selectivity to the desired dehydrogenated product. Thereafter, said dehydrogenatable organic compound, i.e., feedstock, i.e., the desired dehydrogenated product along with steam, hydrogen and organic dehydrogenatable feed, is contacted with a sulfur oxide in the second reaction over a critically defined low surface area catalyst.

As has been previously stated herein, it has normally been the practice to utilize relatively large amounts of sulfur dioxide in the dehydrogenation reaction, i.e., see U.S. Pat. No. 3,299,151. As previously mentioned, such high levels of sulfur compounds, however, tend to drastically reduce catalyst life by promoting the formation of coke. Now, in accordance with the present invention, a sulfur oxide is employed, i.e., $SO_2$ or $SO_3$ or $SO_2/SO_3$ mixtures or their water solutions $H_2SO_3$, $H_2SO_4$, but preferably $SO_2$, and Table I below shows the levels which can be satisfactorily employed herein:

TABLE I

| | Broad | Preferred | More preferred | Most preferred |
|---|---|---|---|---|
| Mol $SO_2$/mol $H_2$ abstracted | 0.01–0.1 | 0.2–1.0 | 0.2–0.7 | 0.2–0.5 |
| Mol $SO_3$/mol $H_2$ abstracted | 0.007–1.0 | 0.15–1.0 | 0.15–0.6 | 0.15–0.4 |

Molar ratios are based on the amount of $SO_2$ or $SO_3$ present therein. It is noted that the term "mol of hydrogen to be abstracted" is used in conjunction with the sulfur level employed (dehydrogenation occurs by abstraction of hydrogen). Thus, for example, in the dehydrogenation of butane to butene, one mole of hydrogen is abstracted but in the dehydrogenation of butane to butadiene two moles of hydrogen are abstracted. Therefore, the term is meaningful and directly related to the actual reaction. It is also noted that the sulfur levels are quite low, relative to the prior art, thereby reducing coke formation tendencies and lengthening catalyst life.

As mentioned above, the dehydrogenation process of the instant invention is carried out in the presence of a sulfur compound. Preferably, the sulfur compound is a sulfur oxide, i.e., $SO_2$ or $SO_3$ or water solutions thereof. However, it is clearly within the purview of the instant invention to employ the sulfur containing compounds in the dehydrogenation zone along with oxygen as is disclosed in U.S. Ser. No. 780,604, filed Dec. 2, 1968, now U.S. Pat. 3,590,090, and may consist of cutting the sulfur containing compounds by the addition of oxygen in staged increments throughout the dehydrogenation zone as is described in copending application Ser. No. 780,570, filed Dec. 2, 1968, now U.S. Pat. 3,585,249, respectively, the pertinent portions of which are incorporated herein by reference. Thus, carrying out the dehydrogeneation process, "in the presence of a sulfur compound," in accordance with the instant invention is meant sulfur compounds, specifically sulfur oxides and the water solutions thereof, either alone or in combination with oxygen.

The effluent reactor stream from the first reactor should be fed to the second reactor as rapidly as possible to prevent undue product selectivity loss to heavier materials. Moreover, it may be necessary to change the reactor stream temperature before the said stream passes over the second catalyst so that the optimum reaction temperature can be obtained. In most cases some cooling, usually less than 100° F., of the reactor stream from the first reactor will be necessary and, by way of nonlimiting examples, can be easily achieved by any one or combination of two or all of the following procedures: first, by addition of the sulfur oxides at the prerequisite lower temperature; second, by water injection; third, by employing a small heat exchanger.

The rate of feeding the reaction products from the first reaction zone over the second reaction zone, i.e., space velocity in the second reaction zone, may vary rather widely as from about 0.01 w./w./hr. (weight of feed/weight of catalyst/hour) to 10 w./w./hr., preferably 0.05 to 1 w./w./hr., and more preferably 0.1 to 0.8 w./w./hr. The reaction temperatures should be at least about 700° F., preferably 800° to 1250° F., more preferably 900° to 1200° F. Pressures may vary over a wide range and can range from subatmospheric, e.g., 0.1 atmosphere, to superatmospheric, e.g., 50 atmospheres or higher. Preferably, however, pressures range from about 5 to about 50 p.s.i.a., and more preferably from about 25 to about 35 p.s.i.a.

As previously mentioned, it is essential to employ in the second reaction zone a low surface area catalyst for the reaction described herein. This requirement is necessitated by the fact that the catalyst must be selective to the desired reaction while inhibiting undesired side reactions such as cracking and/or burning. Various catalysts can be employed which satisfy the low surface area criterion, among which are those that are or could be employed as catalyst support materials. These catalysts can also be described as difficultly reducible oxides or refractory oxides and can be selected from the oxides of metals of Groups II–VIII of the Periodic Chart of the Elements, preferably of Groups II–A, III–A, IV–A, IV–B, V–B, VI–B and VII–B, and most preferably Groups II–A and III–A. Suitable examples of such materials are magnesia, barium oxide, thoria, alumina, boria, vanadia, chromia, titania, silica, silica-alumina, tungsten oxide, zirconia oxide, hafnium oxide and the like. Of these, silica-aluminum, vanadia, magnesia and titanium are more preferred, particularly alumina, titania and magnesium. The most preferred low surface area catalyst is a magnesium oxide catalyst. We recognize that these catalysts need not start out as oxides but may be converted to the oxides during the course of the reaction. For example, nitrate or hydroxide salt is readily converted to its corresponding oxide at reaction temperatures.

Another class of low surface area catalysts applicable to this invention and highly preferred are those based on titanium and oxygen, i.e., titanates. These catalysts show exceptional stability and give good yields of the desired dehydrogenated products. Applicable titanates are those wherein any metal from Groups I–VIII of the Periodic Chart of the Elements is combined with titanium and oxygen. Typically active titanates are: lithium titanate, barium titanate, cerium titanate, nickel titanate, lead titanate, strontium titanate, and the like. It is noted that titanate metal, by itself, can also be employed successfully.

Additionally, such common support materials as silicon carbide; carbon, e.g., coke, graphite; diatomaceous earths, e.g., kieselguhr; clays, both natural and synthetic, e.g., attapulgite clays; magnesium silicates, phosphates, e.g., calcium nickel phosphate, aluminum phosphate; and the like which are low surface area can also be employed although somewhat less effectively than the other materials listed hereinabove.

Of course, all of the catalysts mentioned hereinabove are low surface area catalysts (measured by nitrogen adsorption) and can be successfully employed in the dehydrogenation process. Nevertheless, it has also been found that a critical surface area range exists for many catalysts within which the yield of dehydrogenated product is markedly greater than would ordinarily be expected. Thus, for example, alumina catalysts have a critical surface area range starting above a threshold surface area of about 0.6 squre meters per gram where the yield of dehydrogenated product increases by about ten-fold. In addition, when magnesium oxide is employed, a critical surface area of about 4 square meters per gram exists for magnesium oxide where the yield of dehydrogenated product increases by about ten-fold, when steam is employed as the inert diluent. The critical uper surface area limit where product yield falls off sharply does not exist for either the alumina or magnesium oxide catalysts, the increased formation of by-products and increased coking which accompany increasing surface area establishes a critical upper limit above which it becomes uneconomical to proceed with the reaction. Consequently, it is preferred that the low surface area catalysts have a surface area ranging from about 0.6 to about 100 square meters per gram, preferably about 0.6 to 50 square meters per gram. When magnesium oxide is employed as the low surface area catalyst, the preferred surface area for said catalyst is in the range of from about 20 to about 60 square meters per gram.

Thus, in accordance with the process of the instant invention, high conversion of the dehydrogenatable organic compound at high selectivity is obtained by minimizing both the concentration of the sulfur species and the contact time with that sulfur species over the catalyst bed. The instant invention achieves this objective by first partially dehydrogenating the said compound at relatively low conversion and relatively high selectivity in the absence of sulfur oxides and/or sulfur before effecting high conversion of the said compound in a second catalyst bed by dehydrogenation in the presence of sulfur compounds wherein the dehydrogenation agents can be $SO_2$ and/or $SO_3$ or admixtures of $SO_2$ and/or $SO_3$ with oxygen. As stated, this can be achieved by first partially dehydrogenating the dehydrogenatable organic compound at high selectivity and low conversion in the absence of sulfur oxides and/or sulfur by subjecting the said compound to thermal dehydrogenation and thus, as will be evident to those versed in the art, a substitution for the thermal dehydrogenation with an oxidative dehydrogenation employing either oxygen with a suitable catalyst and/or oxygen with a suitable combination of halogen promoters, as known in literature, so as to allow the oxidative dehydrogenation of the dehydrogenatable organic compound at relatively low conversion and high selectivity clearly is within the purview of the instant invention.

Having now described this invention, the following examples will serve to further illustrate the process. However, no limitations are to be implied from these examples since various modifications and variations will be apparent to those skilled in the art.

Example 1

This example shows the excellent conversions and selectivity levels obtained in accordance with the two-stage dehydrogenation process of the instant invention. Table II shows that, when the feed mixture fed to the second reaction zone of the instant process consists of approximately 70 mole percent dehydrogenatable organic compound, i.e., ethylbenzene, and 30 mole percent of the dehydrogenated compound, i.e., styrene, formed in the first reaction zone, and is contacted with $SO_2$ in the presence of hydrogen (a reaction product from the first reaction zone), that not only is there no loss in yield to the desired dehydrogenated product, i.e., styrene, but in fact there is a significant overall increase in yield to styrene (see Run C).

TABLE II.—$H_2$ ADDITION RUNS

Catalyst=1 M percent $Al_2O_3$ on USP MgO (44 m.$^2$/g.).
Feed=70% ethylbenzene—30% styrene.
Temperature=1,050° F.
HC space velocity=0.4 w./w./hr.
EB/$SO_2$/$H_2$ mole ratio=1/0.375/0.43.
Pressure=20 pounds per square inch.

| Run | Moles $H_2O$ Per mole EB | Per mole HC= EB+ styrene | EB, conversion, percent | Styrene sel. M percent based on EB | Overall styrene yield, M percent | $H_2S$ recovery |
|---|---|---|---|---|---|---|
| A | 10 | | 81 | 88 | 72 | 72 |
| B | 10 | 6 | 67 | 85 | 69 | 90 |
| C | 14 | 10 | 74 | 88 | 75 | 73 |

NOTE.—A=Blank run: pure ethylbenzene feed, no $H_2$.

What is claimed is:

1. A process for the dehydrogenation of a dehydrogenatable organic compound which comprises reacting said compound with steam over an autoregenerative dehydrogenation catalyst in a first reaction zone at a temperature in the range of from about 1025° to about 1500° F. for a time sufficient to convert at least 5 mole percent of said dehydrogenatable organic compound to the desired dehydrogenated product and thereafter contacting the reaction products formed in the first reaction zone with a sulfur oxide in a second reaction zone over a low surface area catalyst at a temperature in the range of from about 700° to about 1250° F.

2. The process of claim 1 wherein the steam is present in the first reaction zone in an amount of from about 1 to about 20 moles of steam per mole of dehydrogenatable organic compound.

3. The process of claim 1 wherein the low surface area catalyst contains a metal selected from the group consisting of Groups II–A, III–A, IV–A, IV–B, V–B, VI–B and VII–B metals and mixtures thereof.

4. The process of claim 3 wherein the catalyst is a metal oxide, salt, or oxide mixture.

5. The process of claim 3 wherein the surface area of the catalyst ranges from about 0.6 to about 100 square meters per gram.

6. A process for the dehydrogenation of a dehydrogenatable organic compound having at least one

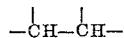

grouping, which comprises reacting said compound with from about 1 to about 20 moles of steam over an autoregenerative dehydrogenation catalyst wherein the metallic component of said catalyst is selected from the group consisting of metals of Groups VI and VIII of the Periodic Table in a first reaction zone at a temperature in the range of from about 1025° to about 1500° F. for a time sufficient to convert from about 5 to about 60 mole percent of said dehydrogenatable organic compound to the desired dehydrogenated product with a selectivity to the desired dehydrogenated product of from about 86 to about 98 mole percent and thereafter contacting the reaction products formed in the first reaction zone with a sulfur oxide in a second reaction over a low surface area catalyst at a temperature in the range of from about 700° to about 1250° F.

7. The process of claim 6 wherein the autoregenerative dehydrogenation catalyst is an iron oxide.

8. The process of claim 6 wherein the temperature in the first reaction zone is in the range of from about 1025° to about 1250° F.

9. The process of claim 6 wherein the dehydrogenatable organic compound is reacted in the first reaction zone for a period of time to convert from about 20 to about 40 mole percent of said dehydrogenatable organic compound to the desired dehydrogenated product.

10. The process of claim 6 wherein the low surface area catalyst contains a metal selected from the group consisting of Groups II–A, III–A, IV–A, IV–B, V–B, VI–B, and VII–B metals and mixtures thereof.

11. The process of claim 10 wherein the surface area of the catalyst ranges from about 0.6 to about 100 square meters per gram.

12. The process of claim 6 wherein the sulfur oxide is sulfur dioxide and is employed in an amount of from about 0.01 to about 1.0 mole per mole of hydrogen abstracted from the dehydrogenatable organic compounds.

13. A process for the dehydrogenation of a dehydrogenatable organic compound which comprises reacting a dehydrogenatable hydrocarbon having at least one

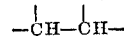

grouping and selected from the group consisting of C$_4$–C$_8$ paraffins and monoolefins, C$_8$–C$_{10}$ alkylbenzenes, and C$_8$–C$_{10}$ alkyl and alkenyl substituted cycloaliphatics with from about 1 to about 20 moles of steam over an autoregenerative iron oxide dehydrogenation catalyst in a first reaction zone at a temperature in the range of from about 1025° to about 1500° F. for a time sufficient to convert from about 20 to about 40 mole percent of said dehydrogenatable organic compound to the desired dehydrogenated product with a selectivity to the desired dehydrogenated product of from about 86 to about 98 mole percent and thereafter contacting the reaction products formed in the first reaction zone with from about 0.01 to about 1.0 sulfur dioxide in a second reaction zone in the presence of a low surface area catalyst containing a member selected from the group consisting of oxides and metals of Groups III–A and IV–B, the surface area of said catalyst being in the range of from about 0.6 to about 100 square meters per gram, said reaction being conducted at a temperature in the range from about 700° to about 1200° F.

14. The process of claim 13 wherein the amount of sulfur dioxide employed is in the range of from about 0.2 to about 0.7 mole per mole of hydrogen abstracted from the dehydrogenatable organic compound.

15. The process of claim 14 wherein the dehydrogenatable hydrocarbon is ethylbenzene.

16. The process of claim 15 wherein the low surface area catalyst contains magnesium.

17. The process of claim 16 wherein the magnesium catalyst has a surface area in the range of from about 20 to about 60 square meters per gram.

18. In a process for the dehydrogenation of a dehydrogenatable organic compound having at least one

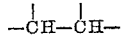

grouping wherein said dehydrogenatable organic compound is reacted with steam over an autoregenerative dehydrogenation catalyst at a temperature in the range of from about 1025° to about 1500° F., the improvement which comprises conducting said reaction for a time sufficient to convert from about 5 to about 60 mole percent of said dehydrogenatable organic compound to the desired dehydrogenated product and thereafter contacting the reaction products from said reaction with a sulfur oxide over a low surface area catalyst at a temperature in the range of from about 700° to about 1250° F.

19. The process of claim 18 wherein said reaction products contain hydrogen.

20. The process of claim 19 wherein said dehydrogenatable organic compound is reacted with from about 1 to about 20 moles of steam over an autoregenerative iron oxide dehydrogenation catalyst.

21. The process of claim 20 wherein the amount of sulfur oxide that is employed is in the range of from about 0.2 to about 0.7 mole of hydrogen abstracted from the dehydrogenatable organic compound.

22. The process of claim 21 wherein the low surface area catalyst contains a metal selected from the group consisting of Groups II–A, III–A, IV–A, IV–B, V–B, VI–B and VII metals and mixtures thereof.

23. The process of claim 22 wherein the dehydrogenatable hydrocarbon is ethylbenzene.

24. The process of claim 23 wherein the low surface area catalyst contains magnesium.

25. The process of claim 24 wherein the magnesium catalyst has a surface area in the range of from about 20 to about 60 square meters per gram.

References Cited
UNITED STATES PATENTS

| | | | |
|---|---|---|---|
| 3,435,086 | 3/1969 | Soderquist et al. | 260—669 R |
| 3,502,737 | 3/1970 | Ghublikian | 260—669 R |
| 3,585,248 | 6/1971 | Pasternak et al. | 260—669 R |
| 3,636,183 | 1/1972 | Pasternak et al. | 260—669 R |

CURTIS R. DAVIS, Primary Examiner

U.S. Cl. X.R.

260—680 E, 683.3